United States Patent
Chen et al.

(10) Patent No.: US 11,849,489 B2
(45) Date of Patent: Dec. 19, 2023

(54) RANDOM ACCESS TRANSMISSION METHOD AND TERMINAL

(71) Applicant: VIVO MOBILE COMMUNICATION CO., LTD., Guangdong (CN)

(72) Inventors: Xiaohang Chen, Guangdong (CN); Peng Sun, Guangdong (CN)

(73) Assignee: Vivo Mobile Communication Co., Ltd., Guangdong (CN)

(*) Notice: Subject to any disclaimer, the term of this patent is extended or adjusted under 35 U.S.C. 154(b) by 191 days.

(21) Appl. No.: 17/377,791

(22) Filed: Jul. 16, 2021

(65) Prior Publication Data

US 2021/0345427 A1    Nov. 4, 2021

Related U.S. Application Data

(63) Continuation of application No. PCT/CN2020/072690, filed on Jan. 17, 2020.

(30) Foreign Application Priority Data

Jan. 18, 2019    (CN) ......................... 201910108483.X

(51) Int. Cl.
  *H04W 74/08* (2009.01)
  *H04W 72/044* (2023.01)
(52) U.S. Cl.
  CPC ... *H04W 74/0841* (2013.01); *H04W 72/0466* (2013.01); *H04W 74/0891* (2013.01)
(58) Field of Classification Search
  CPC ............. H04W 72/53; H04W 74/0808; H04W 72/0453; H04W 56/001; H04W 74/0833;
  (Continued)

(56) References Cited

U.S. PATENT DOCUMENTS 11,470,650 B2 * 10/2022 Lei ..................... H04L 5/0051
2014/0086176 A1    3/2014 Liu et al.
(Continued)

FOREIGN PATENT DOCUMENTS

CN    105723789 A    6/2016
CN    107432028 A    12/2017
(Continued)

OTHER PUBLICATIONS

Qualcomm Inc., "Report of Email Discussion [103#55][NR-U] 2-step RACH Model and Initial Information Contents (Qualcomm)", 3GPP TSG-RAN WG2 Meeting #103bis, R2-1815564, Chengdu, China, Oct. 8-12, 2018.

(Continued)

*Primary Examiner* — Jung Liu
(74) *Attorney, Agent, or Firm* — Price Heneveld LLP

(57) ABSTRACT

The present disclosure discloses a random access transmission method and a terminal. The method includes: obtaining a data scrambling parameter of a physical uplink shared channel PUSCH; and sending a random access message based on the data scrambling parameter, where the random access message corresponds to the PUSCH and a physical random access channel PRACH. In a random access process of a terminal in embodiments of the present disclosure, a random access message is sent on a random access resource based on a data scrambling parameter of a PUSCH. Correspondingly, a network device decodes the PUSCH on the random access resource based on the data scrambling parameter, to obtain the corresponding random access message.

20 Claims, 2 Drawing Sheets

(58) Field of Classification Search
CPC .. H04W 72/23; H04W 74/006; H04W 74/008; H04W 48/16; H04W 72/12; H04W 72/0446; H04W 72/20; H04W 72/21; H04L 5/0094; H04L 5/0053; H04L 5/00; H04L 5/0044

See application file for complete search history.

(56) References Cited

U.S. PATENT DOCUMENTS

| | | | |
|---|---|---|---|
| 2017/0170931 A1 | 6/2017 | Kusashima et al. | |
| 2018/0041857 A1 | 2/2018 | Ouchi et al. | |
| 2018/0124822 A1 | 5/2018 | Wang et al. | |
| 2018/0124824 A1* | 5/2018 | Lee | H04L 5/0094 |
| 2018/0146498 A1 | 5/2018 | Sahlin et al. | |
| 2018/0331792 A1 | 11/2018 | Yang et al. | |
| 2019/0373642 A1 | 12/2019 | Suzuki et al. | |
| 2020/0045650 A1 | 2/2020 | Suzuki et al. | |
| 2020/0229157 A1* | 7/2020 | Rastegardoost | H04W 72/542 |
| 2021/0360706 A1* | 11/2021 | Cirik | H04W 74/004 |
| 2022/0167391 A1* | 5/2022 | Babaei | H04W 28/04 |
| 2022/0174724 A1* | 6/2022 | Babaei | H04L 5/0082 |
| 2023/0038123 A1* | 2/2023 | Yang | H04W 72/53 |

FOREIGN PATENT DOCUMENTS

| | | |
|---|---|---|
| CN | 109068393 A | 12/2018 |
| CN | 109756314 A | 5/2019 |
| CN | 109863817 A | 6/2019 |
| CN | 109892000 A | 6/2019 |
| EP | 3910857 A1 | 11/2021 |
| WO | 2016175496 A1 | 11/2016 |
| WO | 2017078501 A1 | 5/2017 |
| WO | 2018135640 A1 | 7/2018 |
| WO | 2018151230 A1 | 8/2018 |

OTHER PUBLICATIONS

Nokia, "On 2-step Random Access Procedure", 3GPP TSG RAN WG1 Ad-Hoc Meeting 1901, R1-1901192, Taipei, Taiwan, Jan. 21-25, 2019.

Nokia, "On Enhancements to Initial Access Procedures for NR-U", 3GPP TSG RAN WG1 Ad-Hoc Meeting 1901, R1-1900309, Taipei, Taiwan, Jan. 21-25, 2019.

Oppo, "Maintenance for Physical random access channel and procedure", 3GPP TSG RAN WG1 Meeting #94bis, R1-1810989, Chengdu, China, Oct. 8-12, 2018.

"Study on NR-based access to unlicensed specturm (Release 16)", 3GPP TR 38.889 V16.0.0 (Dec. 2018), Valbonne—France.

ZTE, "Summary of AI 7.2.1.3 on procedures for NOMA", 3GPP TSG RAN WG 1 Meeting #94b, RI-1811871, Chengdu, China, Oct. gth-12, 2018.

Qualcomm, "Clarification on PUSCH OM-RS scrambling", 3GPP TSG-RAN WG1 #54, R1-083165, Aug. 18-22, 2008 Jeju, Korea.

ZTE Corporation, "New work item: Two step RACH for NR", 3GPP TSG RAN Meeting #82, RP-182854, Sorrento, Italy, Dec. 10-13, 2018.

* cited by examiner

RANDOM ACCESS TRANSMISSION METHOD AND TERMINAL

CROSS-REFERENCE TO RELATED APPLICATIONS

This application is a continuation application of International Application No. PCT/CN2020/072690 filed on Jan. 17, 2020, which claims priority to Chinese Patent Application NO.201910108483.X, filed on Jan. 18, 2019 in China, both disclosures of which are incorporated herein by reference in their entireties.

TECHNICAL FIELD

The present disclosure relates to the field of communications technologies, and in particular, to a random access transmission method and a terminal.

BACKGROUND

A fifth-generation (5G) mobile communications system, or referred to as a new radio (NR) system, needs to adapt to diversified scenarios and service requirements. Main scenarios of the NR system include enhanced mobile broadband (eMBB) communication, massive machine type communications (mMTC), and ultra-reliable and low latency communications (URLLC). These scenarios impose requirements such as high reliability, low latency, high bandwidth and wide coverage on the system. For a periodic service with a fixed data packet size, to reduce overheads of downlink control signaling, a network device may continuously allocate specified resources in a semi-static scheduling manner for transmission of the periodic service.

In an uplink transmission mode, if a terminal needs to send uplink data, the terminal first needs to achieve uplink timing synchronization in a random access process, that is, obtain uplink timing advance (TA) information from the network device. After achieving the uplink synchronization, the terminal may send the uplink data through dynamic scheduling or semi-static scheduling. When an uplink data packet is relatively small, to reduce resources and power consumption, the terminal may send the uplink data in an asynchronous state.

In a random access process, for example, a non-contention based random access process or a contention-based random access process, the terminal is also in a non-synchronous state when sending a preamble. As shown in FIG. 1, a cyclic prefix (Cyclic prefix, CP) needs to be added to the preamble to offset impact of a transmission latency, and a guard (Guard) exists between different terminals to reduce interference.

When the terminal delivers the uplink data in the asynchronous state, for example, when the terminal delivers a physical uplink shared channel (Physical Uplink Shared Channel, PUSCH) in the asynchronous state, scrambling needs to be performed on a demodulation reference signal (DMRS) sequence of the PUSCH.

In the non-contention based random access process, that is, in 2-step PRACH, when initiating random access, the terminal sends a random access message, or referred to as a message A (msgA), on a PUSCH resource in random access resources. In this case, if the network device cannot learn information about the PUSCH resource, the network device cannot successfully detect the msgA sent by the terminal, resulting in an uplink transmission failure.

SUMMARY

Embodiments of the present disclosure provide a random access transmission method and a terminal, to resolve an uplink transmission failure problem in a random access process.

According to a first aspect, an embodiment of the present disclosure provides a random access transmission method, applied to a terminal side and including:
obtaining a data scrambling parameter of a physical uplink shared channel PUSCH; and
sending a random access message based on the data scrambling parameter, where the random access message corresponds to the PUSCH and a physical random access channel PRACH.

According to a second aspect, an embodiment of the present disclosure further provides a terminal, including:
an obtaining module, configured to obtain a data scrambling parameter of a physical uplink shared channel PUSCH; and
a sending module, configured to send a random access message based on the data scrambling parameter, where the random access message corresponds to the PUSCH and a physical random access channel PRACH.

According to a third aspect, an embodiment of the present disclosure provides a terminal. The terminal includes a processor, a memory, and a computer program that is stored in the memory and that runs on the processor, and when the processor executes the computer program, the steps of the foregoing random access transmission method are implemented.

According to a fourth aspect, an embodiment of the present disclosure provides a computer-readable storage medium. The computer-readable storage medium stores a computer program, and when a processor executes the computer program, the steps of the foregoing random access transmission method are implemented In this way, in a random access process of a terminal in the embodiments of the present disclosure, a random access message is sent on a random access resource based on a data scrambling parameter of a PUSCH. Correspondingly, a network device decodes the PUSCH on the random access resource based on the data scrambling parameter, to obtain the corresponding random access message. Therefore, a data detection success rate is improved, unnecessary blind detection is avoided, and detection complexity of the network device is reduced.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

Figure 1:
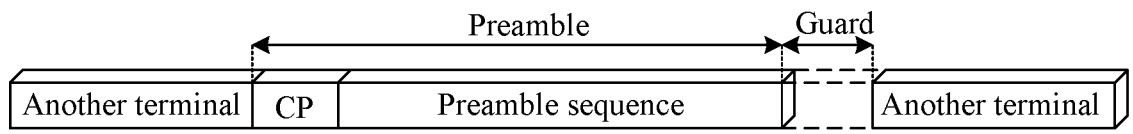
FIG. 1 is a schematic diagram of resource mapping of a random access message in a random access process.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. Instead, these embodiments are provided in order to provide a more thorough understanding of the present disclosure and to be able to convey the scope of the present disclosure to a person skilled in the art.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to a Long Term Evolution (LTE)/LTE-Advanced (LTE-A) system, and can also be used in various wireless communications systems such as Code Division Multiple Access (CDMA), Time Division Multiple Access (TDMA), Frequency Division Multiple Access FDMA), Orthogonal Frequency Division Multiple Access (OFDMA), Single Carrier Frequency Division Multiple Access (SC-FDMA), and another system. The terms "system" and "network" are often used interchangeably. The technology described herein can be used in the above-mentioned systems and radio technologies as well as other systems and radio technologies. However, the following descriptions describe an NR system for example purposes, and NR terms are used in most of the following descriptions, although these techniques can also be applied to an application other than an NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Figure 2:
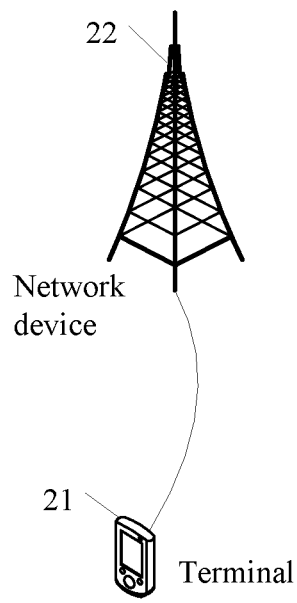
FIG. 2 is a block diagram of a mobile communications system to which embodiments of the present disclosure can be applied.

Referring to FIG. 2, FIG. 2 is a block diagram of a wireless communications system to which embodiments of the present disclosure can be applied.

The wireless communications system includes a terminal 21 and a network device 22. The terminal 21 may also be referred to as a terminal device to user equipment (User Equipment, UE). The terminal 21 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 21 is not limited in the embodiments of the present disclosure. The network device 22 may be a base station or a core network. The base station may be a base station of 5G or a later version (for example, gNB or 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specified technical term. It should be noted that, in the embodiments of the present disclosure, only a base station in an NR system is used as an example, but a specific type of the base station is not limited.

The base station may communicate with the terminal 21 under control of a base station controller. In various examples, the base station controller may be a core network or a part of some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on a plurality of carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 21 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station may also utilize different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink used to carry uplink (UL) transmission (for example, from the terminal 21 to the network device 22), or a downlink used to carry downlink (DL) transmission (for example, from the network device 22 to the terminal 21). The UL transmission may also be referred to as reverse link transmission, and the DL transmission may also be referred to as forward link transmission. The downlink transmission may be performed on a licensed band, an unlicensed band, or both. Similarly, the uplink transmission may be performed on a licensed band, an unlicensed band, or both.

Figure 3:
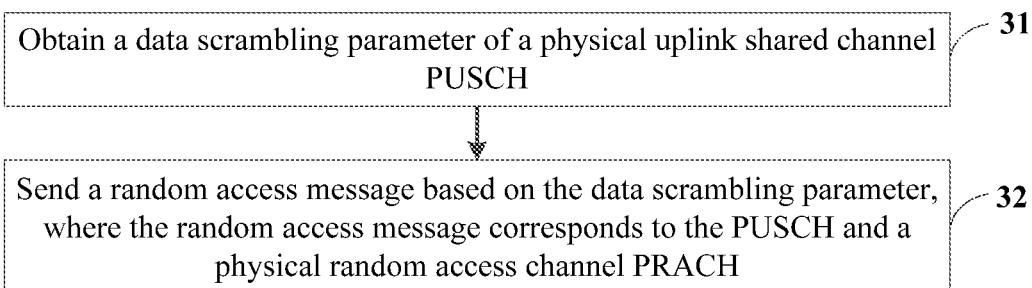
FIG. 3 is a schematic flowchart of a random access transmission method according to an embodiment of the present disclosure.

An embodiment of the present disclosure provides a random access transmission method, applied to a terminal. As shown in FIG. 3, the method includes the following steps.

Step 31: Obtain a data scrambling parameter of a physical uplink shared channel PUSCH.

In this embodiment of the present disclosure, the data scrambling parameter is used to scramble the PUSCH. The data scrambling parameter may also be referred to as a PUSCH scrambling parameter or a scrambling identifier parameter. The data scrambling parameter may be determined based on a first parameter item, and the first parameter item is related to a PRACH resource and/or a PUSCH resource. For example, the first parameter item includes parameter information related to the PRACH resource and/or the PUSCH resource, the parameter information related to the PRACH resource and/or the PUSCH resource may include a plurality of parameters, and the data scrambling parameter may be determined based on at least one of the plurality of parameters.

Alternatively, the data scrambling parameter may be configured by a network device. The terminal obtains ae random access channel RACH configuration from the network device, and the terminal obtains the data scrambling parameter from the RACH configuration. For example, the data scrambling parameter is one of at least one data scrambling parameter in a data scrambling parameter set in the RACH configuration. For example, one data scrambling parameter set includes four data scrambling parameters. The terminal selects one of the four data scrambling parameters in the data scrambling parameter set according to a preset rule. It should be noted that there may be one or more data scrambling parameter sets.

Step 32: Send a random access message based on the data scrambling parameter, where the random access message corresponds to the PUSCH and a physical random access channel PRACH.

The terminal sends a random access message (msgA) on a random access resource based on the data scrambling parameter. The random access resource is used in a random access process, the random access resource corresponds to a PRACH resource and a PUSCH resource, the PRACH resource is used to transmit a random access preamble, and the PUSCH resource is used to transmit information or uplink data related to random access. Correspondingly, the network device receives the random access message on the random access resource. It should be noted that the network device may also determine the data scrambling parameter based on the first parameter item, that is, the network device is consistent with the terminal in understanding. Both the network device and the terminal may determine the data scrambling parameter based on the first parameter item. In this way, the network device can detect and demodulate the PUSCH directly based on the data scrambling parameter, to obtain the msgA, thereby ensuing normal running of the random access process.

Further, step 32 may be implemented in but is not limited to the following manner: determining a scrambling sequence of the PUSCH based on the data scrambling parameter; and sending the random access message based on the scrambling sequence of the PUSCH. When the scrambling sequence of the PUSCH is generated, initialization may be performed in the following manner. An initialization scrambling sequence of the PUSCH is a function of the data scrambling parameter, such as $c_{init}=f(n_{ID}, \ldots)$, where nip is the data scrambling parameter of the PUSCH, or is referred to as the scrambling identifier parameter.

Specifically, when the scrambling sequence of the PUSCH is generated, the initialization scrambling sequence may be obtained by using the following function relation formula:

$$c_{init}=n_{RNTI}2^{15}+n_{ID}$$

$C_{init}$ is the initialization scrambling sequence of the PUSCH, $n_{RNTI}$ is radio network temporary identifier (RNTI) information, and nip is the scrambling identifier parameter.

In a case that the data scrambling parameter is determined based on the first parameter item, the data scrambling parameter is determined based on a parameter item associated with the PRACH resource and/or a parameter item associated with the PUSCH resource, for example, the data scrambling parameter is determined based on a related parameter of the PRACH resource, or the data scrambling parameter is determined based on a related parameter of the PUSCH resource, or the data scrambling parameter is jointly determined based on a related parameter of the PRACH resource and a related parameter of the PUSCH resource.

For example, the data scrambling parameter is determined based on the related parameter of the PUSCH resource. Optionally, the data scrambling parameter is determined based on a PUSCH occasion corresponding to the PUSCH resource. That is, the data scrambling parameter is obtained based on the PUSCH occasion, and the PUSCH occasion is used to transmit a PUSCH (msgA PUSCH) related to the msgA.

Optionally, the data scrambling parameter is determined based on a time domain resource index (time index) and/or a frequency domain resource index (frequency index) of the PUSCH occasion. For example, the terminal determines the data scrambling parameter based on a function g of the time index and the frequency index of the PUSCH occasion, for example, $n_{ID}=g$ (time index, frequency index).

The foregoing describes that the data scrambling parameter is determined based on information about the PUSCH resource. The following further describes that the data scrambling parameter is determined based on information about the PRACH resource.

In a case that the data scrambling parameter is determined based on the related parameter of the PRACH resource, the data scrambling parameter may be determined based on at least one of the following information about the PRACH resource:

I. Random Access Channel Occasion RO

The data scrambling parameter may be determined based on the random access channel occasion RO. In an NR system, the network device may be configured with a plurality of physical random channel transmission occasions (PRACH occasion, or RO for short) of Frequency Division Multiplex (FDM) in a time instance, and the time instance is duration required for a physical random channel (PRACH) or a time domain resource used to transmit a PRACH. A quantity of ROs that can be used to perform FDM in one time instance may be: {1, 2, 4, 8}. Further, optionally, the RO in this embodiment of the present disclosure is a valid RO, and the valid RO is an RO that can be used to transmit a PRACH.

Further, the data scrambling parameter is determined based on at least one of the following information associated with the RO:

1. First index information of a synchronization signal block (Synchronization Signal and Physical Broadcast Channel Block, SS/PBCH block, or SSB for short) associated with the RO. That is, the data scrambling parameter may be determined based on the first index information of the SSB associated with the RO, for example, the data scrambling parameter nip is equal to the first index information of the SSB associated with the RO. There is an association relationship between the RO and an actually sent synchronization signal/physical broadcast channel block (Synchronization Signal and Physical Broadcast Channel Block, SS/PBCH block, or SSB for short). One RO may be associated with a plurality of SSBs, and one SSB may be associated with a plurality of ROs. A quantity of SSBs associated with one RO may be {1/8, 1/4, 1/2, 1, 2, 4, 8, 16}. For example, eight ROs may be used to perform FDM in one time instance, and four SSBs: an SSB# 0, an SSB# 1, an SSB# 2, and an SSB# 3 are actually transmitted. Each SSB is associated with two ROs. If the terminal sends a PRACH on an RO corresponding to the SSB# 0, the terminal can select only one of an RO# 0 and an RO# 1 to send the PRACH. It should be noted that, for a non-contention based random access process, there may be an association relationship between an RO and a channel state information-reference signal (CSI-RS). Correspondingly, the data scrambling parameter may also be determined based on the CSI-RS corresponding to the RO.

2. Second index information of a time-frequency domain resource corresponding to the RO. That is, the data scrambling parameter may be determined based on the second index information of the time-frequency domain resource corresponding to the RO, and the second index information includes but is not limited to: time domain index information (time index) corresponding to the RO and/or frequency domain index information (frequency index) corresponding to the RO. For example, the data scrambling parameter may be obtained through calculation by using a function h of the time domain index information and the frequency domain index information corresponding to the RO, for example: $n_{ID}$=h (time index, frequency index).

3. Third index information of a primary synchronization signal (PSS) transmitted in the SSB associated with the RO. That is, the data scrambling parameter may further be determined based on the index information of the PSS transmitted in the SSB associated with the RO. For example, the data scrambling parameter nip is equal to the index information of the PSS transmitted in the SSB.

4. Fourth index information of a secondary synchronization signal (PSS) transmitted in the SSB associated with the RO. That is, the data scrambling parameter may further be determined based on the index information of the SSS transmitted in the SSB associated with the RO. For example, the data scrambling parameter nip is equal to the index information of the SSS transmitted in the SSB.

II. Random Access Preamble

The data scrambling parameter may be determined based on the random access preamble. The random access preamble may be transmitted only on a time domain resource configured by using a parameter PRACH configuration index (ConfigurationIndex) and a frequency domain resource configured by using a parameter prach-FDM, that is, the random access preamble may be transmitted only in the RO. A PRACH frequency domain resource $N_{RA} \in \{0, 1, \ldots, M-1\}$, where M is equal to a higher-layer parameter prach-FDM. During initial access, the PRACH frequency domain resource $N_{RA}$ starts to be numbered in an ascending order from the lowest RO resource in an initial active uplink bandwidth part. Otherwise, the PRACH frequency domain resource $N_{RA}$ to be numbered in ascending order from the lowest RO resource in an active uplink bandwidth part. Specifically, the data scrambling parameter is determined based on fifth index information of the random access preamble, that is, the data scrambling parameter is determined based on a preamble index. For example, the data scrambling parameter nip is equal to the index information of the random access preamble It should be noted that the data scrambling parameter may further be jointly determined based on the random access channel occasion RO and the random access preamble. For example, if an RO1 is associated with two pieces of SSB index information: the SSB# 0 and the SSB# 1, the terminal may obtain two possible data scrambling parameters A and B based on the SSB index information associated with the RO1. Further, if two pieces of random access preamble index information in the RO1 are associated with one piece of SSB index information, for example, a preamble# 1 and a preamble# 2 are associated with the SSB# 0, the terminal may obtain a finally determined data scrambling parameter A or B based on the preamble index information. If the preamble# 1 is associated, it is determined that the data scrambling parameter is A, and if the preamble# 2 is associated, it is determined that the data scrambling parameter is B.

III. Random access radio network temporary identifier (RA-RNTI). That is, the data scrambling parameter may be determined based on the RA-RNTI. For example, the data scrambling parameter nib is equal to the RA-RNTI.

The foregoing describes the manner in which the data scrambling parameter is determined based on the first parameter item. The following further describes a manner in which the data scrambling parameter is configured by the network device.

Specifically, the data scrambling parameter is configured by the network device through a system broadcast message. The system broadcast message includes a system information block (SIB) or a master information block (MIB).

Further, the system broadcast message may include the data scrambling parameter, or the system broadcast message includes configuration information of a data scrambling parameter set, where the data scrambling parameter is one of data scrambling parameter sets (such as an ID set) configured by the network device by using the system broadcast message. In this embodiment, the data scrambling parameter nib is one of ID sets configured by using the system broadcast message SIB/MIB. It should be noted that if the data scrambling parameter set is not configured in the SIB/MIB, the terminal uses a data scrambling parameter of a default DMRS, for example, defines the default data scrambling parameter nib as a cell number (Cell ID).

Further, it is assumed that the data scrambling parameter set includes K nibs. Further, the data scrambling parameter nib is one of the following association parameters associated with the data scrambling parameter set:

I. RO Corresponding to a Random Access Process.

The terminal selects the $n_{ID}$ from a set of K data scrambling parameters $n_{ID}$,based on the RO. The network device configures or pre-defines an association relationship between an RO and an $n_{ID}$. For example, each N ROs are associated with one $n_{ID}$.

II. Index Information of an SSB Associated with the RO.

The terminal selects the mu from a set of K $n_{ID}s$ based on the index information of the SSB associated with the RO. The network device configures or pre-defines an association relationship between an SSB and an $n_{ID}$. For example:

Each M SSBs are associated with one mu. Specifically, if one given RO is associated with M SSBs, all random access preambles transmitted in the RO correspond to a same $n_{id}$.

III. Index Information of a Random Access Preamble.

The terminal selects the mu from a set of K $n_{ID}s$ based on the index information of the PRACH preamble transmitted in the msgA. The network device configures or pre-defines an association relationship between a preamble and an $n_{ID}$. For example, each R preamble random access preambles are associated with one $n_{ID}$. Specifically, if one given RO is associated with N*R consecutive preambles, preambles transmitted in the RO correspond to an $n_{ID,1}$ to an $n_{ID,N}$.

Further, in a case that the data scrambling parameter is configured by the network device, the data scrambling parameter is one of data scrambling parameter sets configured by the network device by using the system broadcast message. The system broadcast message may further include at least one of the following information:

an association relationship between an RO and the data scrambling parameter, where for example, the association relationship between the RO and the data scrambling parameter is: each N ROs are associated with a data scrambling parameter of one PUSCH; or an association relationship between a random access preamble and the data scrambling parameter, where for example, the association relationship between the preamble and the data scrambling parameter is: R preambles are associated with a data scrambling parameter of one PUSCH. A data scrambling parameter of a PUSCH associated with R consecutive preambles in each RO is associated with an $n_{id,k}$, where 0≤k≤K−1.

Specifically, step 32 in this embodiment of the present disclosure may be alternatively implemented in the following manner: mapping the data scrambling parameter to a corresponding random access resource based on a mapping sequence, and sending the random access message, where the mapping sequence includes at least one of a code domain mapping sequence, a frequency domain mapping sequence, or a time domain mapping sequence. Specifically, in this embodiment, for example, mapping is successively performed in the code domain mapping sequence, the frequency domain mapping sequence, and the time domain mapping sequence. Data scrambling parameters of a plurality of PUSCHs may be associated with the RO in the following sequence:

First, a plurality of preambles are associated with one RO in code domain (preamble index) ascending or descending order;

second, a plurality of FDM ROs are associated in frequency domain (frequency resource index) ascending or descending order;

third, a plurality of time division multiplexing (TDM) ROs are associated with one PRACH slot in time domain (time resource index) ascending or descending order; and finally, a plurality of PRACH slots are associated in PRACH slot ascending order.

In the random access transmission method in this embodiment of the present disclosure, in a random access process of a terminal, a random access message is sent on a random access resource based on a data scrambling parameter of a PUSCH. Correspondingly, a network device decodes the PUSCH on the random access resource based on the data scrambling parameter, to obtain the corresponding random access message. Therefore, a data detection success rate is improved, unnecessary blind detection is avoided, and detection complexity of the network device is reduced.

The foregoing embodiments separately describe the random access transmission method in different scenarios. The following embodiment further describes a terminal corresponding to the random access transmission method with reference to the accompanying drawings.

Figure 4:
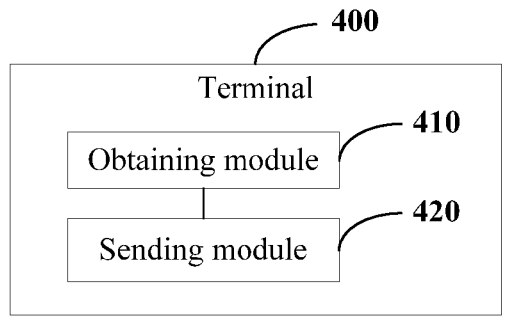
FIG. 4 is a schematic diagram of a module structure of a terminal according to an embodiment of the present disclosure.

As shown in FIG. 4, a terminal 400 in this embodiment of the present disclosure can implement details of the method in the foregoing embodiment in which a data scrambling parameter of a physical uplink shared channel PUSCH is obtained; and a random access message is sent based on the data scrambling parameter, and achieve a same effect. The random access message corresponds to the PUSCH and a physical random access channel PRACH. The terminal 400 specifically includes the following functional module:

an obtaining module 410, configured to obtain a data scrambling parameter of a physical uplink shared channel PUSCH; and a sending module 420, configured to send a random access message based on the data scrambling parameter, where the random access message corresponds to the PUSCH and a physical random access channel PRACH.

The sending module 420 includes:

a determining submodule, configured to determine a scrambling sequence of the PUSCH based on the data scrambling parameter; and a first sending submodule, configured to send the random access message based on the scrambling sequence.

The data scrambling parameter is determined based on a PUSCH resource and/or a PRACH resource.

The data scrambling parameter is determined based on a PUSCH occasion corresponding to the PUSCH resource.

The data scrambling parameter is determined based on at least one of the following information about the PRACH resource:

a random access channel occasion RO;

a random access preamble; or a random access radio network temporary identifier RA-RNTI.

The data scrambling parameter is determined based on at least one of the following information associated with the RO:

first index information of a synchronization signal block SSB associated with the RO;

second index information of a time-frequency domain resource corresponding to the RO;

third index information of a primary synchronization signal PSS transmitted in the SSB associated with the RO; or fourth index information of a secondary synchronization signal SSS transmitted in the SSB associated with the RO.

The data scrambling parameter is determined based on fifth index information of the random access preamble.

The data scrambling parameter is configured by a network device through a system broadcast message.

The system broadcast message includes configuration information of a data scrambling parameter set.

The data scrambling parameter is one of the following association parameters associated with the data scrambling parameter set:

an RO corresponding to a random access process;

index information of an SSB associated with the RO; and index information of a random access preamble.

The system broadcast message further includes at least one of the following information:

an association relationship between an RO and the data scrambling parameter; or an association relationship between a random access preamble and the data scrambling parameter.

The sending module 420 further includes:

a second sending submodule, configured to: map the data scrambling parameter to a corresponding random access resource based on a mapping sequence, and send the random access message, where the mapping sequence includes at least one of a code domain mapping sequence, a frequency domain mapping sequence, or a time domain mapping sequence.

It should be noted that in a random access process of a terminal in this embodiment of the present disclosure, a random access message is sent on a random access resource based on a data scrambling parameter of a PUSCH. Correspondingly, a network device decodes the PUSCH on the random access resource based on the data scrambling parameter, to obtain the corresponding random access message. Therefore, a data detection success rate is improved, unnecessary blind detection is avoided, and detection complexity of the network device is reduced.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. In an implementation process, the steps in the foregoing method or the foregoing modules can be implemented by using a hardware integrated logical circuit in the processing element, or by using instructions in a form of software.

For example, the modules may be configured as one or more integrated circuits for implementing the foregoing method, for example, one or more application specific integrated circuits (ASIC), one or more microprocessors (DSP), or one or more field programmable gate arrays (FPGA). For another example, when a module above is implemented by invoking program code by using a processing element, the processing element may be a general-purpose processor, for example, a central processing unit (CPU) or another processor that can invoke program code. For another example, these modules may be integrated together, and implemented in a form of a system-on-a-chip (SOC).

Figure 5:
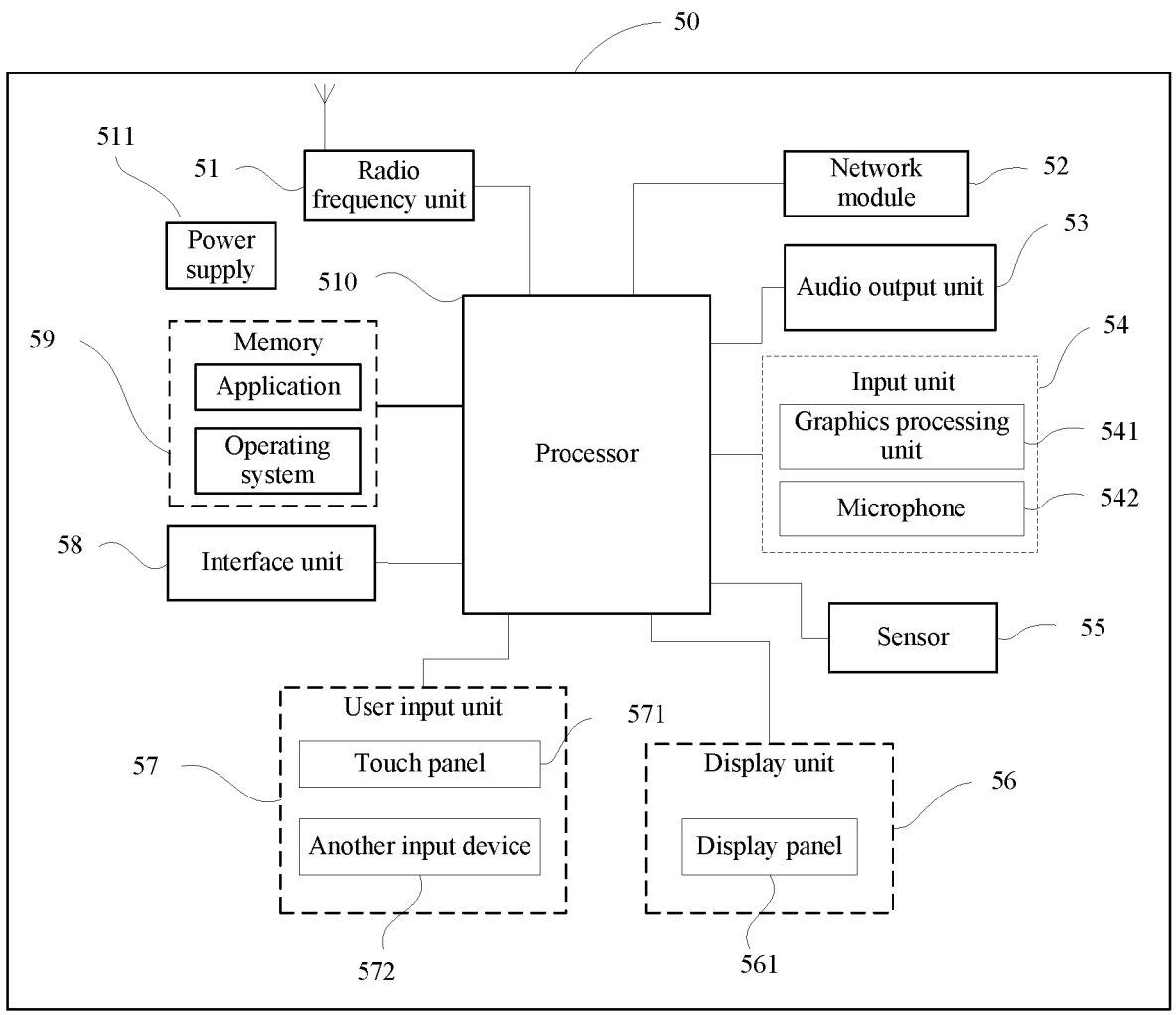
FIG. 5 is a structural block diagram of a terminal according to an embodiment of the present disclosure.

To better implement the foregoing objective, further, FIG. 5 is a schematic structural diagram of hardware of a terminal according to the embodiments of the present disclosure. A terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Those skilled in the art may understand that the terminal structure shown in FIG. 5 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 51 is configured to: obtain a data scrambling parameter of a physical uplink shared channel PUSCH; and send a random access message based on the data scrambling parameter, where the random access message corresponds to the PUSCH and a physical random access channel PRACH.

The processor 510 is configured to control the radio frequency unit 51 to send and receive data.

In a random access process of a terminal in this embodiment of the present disclosure, a random access message is sent on a random access resource based on a data scrambling parameter of a PUSCH. Correspondingly, a network device decodes the PUSCH on the random access resource based on the data scrambling parameter, to obtain the corresponding random access message. Therefore, a data detection success rate is improved, unnecessary blind detection is avoided, and detection complexity of the network device is reduced.

It should be understood that in this embodiment of the present disclosure, the radio frequency unit 51 may be configured to receive and transmit information, or receive and transmit signals during a call. Specifically, the radio frequency unit 51 receives downlink data from a base station, and transmits the downlink data to the processor 510 for processing; and in addition, transmits uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may communicate with a network and another device through a wireless communication system.

The terminal provides a user with wireless broadband Internet access through the network module 52, for example, helps the user send and receive emails, browse web pages, and access streaming media.

The audio output unit 53 may convert audio data received by the radio frequency unit 51 or the network module 52 or stored in the memory 59 into an audio signal, and output the audio signal into sound. In addition, the audio output unit 53 can also provide audio output related to a specific function performed by the terminal 50 (for example, call signal receiving sound or message receiving sound). The audio output unit 53 includes a speaker, a buzzer, a receiver, and the like.

The input unit 54 is configured to receive an audio signal or a video signal. The input unit 54 may include a graphics processing unit (GPU) 541 and a microphone 542, and the graphics processing unit 541 processes image data of a still picture or video obtained by an image capture apparatus (such as a camera) in a video capture mode or an image capture mode. The processed image frame may be displayed on the display unit 56, and the image frame processed by the graphics processing unit 541 may be stored in the memory 59 (or another storage medium) or sent by the radio frequency unit 51 or the network module 52. The microphone 542 may receive sound and can process such sound into audio data. Processed audio data may be converted, in telephone call mode, into a format that may be sent to a mobile communication base station via the radio frequency unit 51 for output.

The terminal 50 further includes at least one type of sensor 55, such as a light sensor, a motion sensor, and another sensor. Specifically, the light sensor includes an ambient light sensor and a proximity sensor. The ambient light sensor may adjust luminance of the display panel 561 based on brightness of ambient light. The proximity sensor may turn off the display panel 561 and/or backlight when the terminal 50 moves to an ear. As a type of motion sensor, the acceleration sensor can detect a value of an acceleration in each direction (generally three axes), and detect a value and a direction of gravity when the acceleration sensor is static, and may be configured to recognize a terminal posture (for example, switching between a landscape screen and a portrait screen, relevant games, and magnetometer posture calibration) and perform a function related to vibration recognition (such as a pedometer or a knock), and the like. The sensor 55 may further include a fingerprint sensor, a pressure sensor, an iris sensor, a molecular sensor, a gyroscope, a barometer, a hygrometer, a thermometer, an infrared sensor, and the like. Details are not described herein.

The display unit 56 is configured to display information entered by a user or information provided for a user. The display unit 56 may include a display panel 561. The display panel 561 may be configured in a form of a liquid crystal display (LCD), an organic light-emitting diode (OLED), or the like.

The user input unit 57 may be configured to receive input numeral or character information, and generate key signal input related to user setting and functional control of the terminal. Specifically, the user input unit 57 includes a touch panel 571 and another input device 572. The touch panel 571 is also referred to as a touchscreen, and may collect a touch operation performed by a user on or near the touch panel 571 (such as an operation performed by a user on the touch panel 571 or near the touch panel 571 by using any proper object or accessory, such as a finger or a stylus). The touch panel 571 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 571 may be of a resistive type, a capacitive type, an infrared type, a surface acoustic wave type, or the like. The user input unit 57 may include another input device 572 in addition to the touch panel 571. Specifically, the another input device 572 may include but is not limited to a physical keyboard, a function key (such as a volume control key or an on/off key), a trackball, a mouse, and a joystick. Details are not described herein.

Further, the touch panel 571 may cover the display panel 561. When detecting the touch operation on or near the touch panel 571, the touch panel 571 transmits the touch operation to the processor 510 to determine a type of a touch event, and then the processor 510 provides corresponding visual output on the display panel 561 based on the type of the touch event. In FIG. 5, the touch panel 571 and the display panel 561 are used as two independent components to implement input and output functions of the terminal. However, in some embodiments, the touch panel 571 and the display panel 561 may be integrated to implement the input and output functions of the terminal. This is not specifically limited herein.

The interface unit 58 is an interface connecting an external apparatus to the terminal 50. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 58 may be configured to receive input (for example, data information and power) from an external apparatus and transmit the received input to one or more elements in the terminal 50 or may be configured to transmit data between the terminal 50 and an external apparatus.

The memory 59 may be configured to store a software program as well as every kind of data. The memory 59 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 59 may include a high-speed random access memory, and may further include a non-volatile memory such as at least one magnetic disk storage component, a flash memory component, or another volatile solid-state storage component.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, an application processor and a modem processor may be integrated into the processor 510. The application processor mainly processes an operating system, a user interface, an application, and the like. The modem processor mainly processes wireless communications. It can be understood that, alternatively, the modem processor may not be integrated into the processor 510.

The terminal 50 may further include the power supply 511 (such as a battery) that supplies power to each component. Optionally, the power supply 511 may be logically connected to the processor 510 by using a power management system, so as to implement functions such as charging, discharging, and power consumption management by using the power management system.

In addition, the terminal 50 includes some function modules not shown, and details are not described herein.

Optionally, an embodiment of the present disclosure further provides a terminal, including a processor 510, a memory 59, and a computer program that is stored in the memory 59 and that can run on the processor 510. When executing the computer program, the processor 510 implements the processes of the foregoing random access transmission method embodiment and a same technical effect can be achieved. To avoid repetition, details are not described herein again. The terminal may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device (or User Equipment). This is not limited herein.

An embodiment of the present disclosure further provides a computer-readable storage medium. The computer-readable storage medium stores a computer program, and when executing the computer program, a processor implements the processes of the foregoing random access transmission method embodiment and a same technical effect can be achieved. To avoid repetition, details are not described herein again. The computer-readable storage medium is, for example, a read-only memory (ROM), a random access memory (RAM), a magnetic disk, or an optical disc.

A person of ordinary skill in the art may be aware that, in combination with the examples in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected based on actual requirements to achieve the objectives of the solutions in the embodiments.

In addition, function units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on this understanding, the essence of the technical solutions of this disclosure, or the part contributing to the prior art, or some of the technical solutions may be represented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

In addition, it should be noted that in the apparatus and method of the present disclosure, it is obvious that the components or steps may be decomposed and/or recombined. These decomposition and/or recombination shall be considered equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be implemented by running a program or a group of programs on any computing apparatus. The computing apparatus may be a well-known general-purpose apparatus. Therefore, the objective of the present disclosure may also be implemented by providing only a program product that includes program code for implementing the method or apparatus. In other words, such a program product also constitutes the present disclosure, and a storage medium that stores such a program product also constitutes the present disclosure. Obviously, the storage medium may be any well-known storage medium or any storage medium to be developed in the future. It should also be noted that in the apparatus and method of the present disclosure, it is obvious that each component or step may be decomposed and/or recombined. These decomposition and/or recombination shall be considered equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The above embodiments are preferred embodiments of the present disclosure. It should be noted that, within the technical concept of the present disclosure, those ordinarily skilled in the art can make various improvements and modifications, which shall all fall within the protective scope of the present disclosure.

What is claimed is:

1. A random access transmission method, applied to a terminal side, wherein the random access transmission method comprises:
   obtaining a data scrambling parameter of a physical uplink shared channel (PUSCH); and
   sending a random access message msgA on a random access resource based on the data scrambling parameter, wherein the random access resource corresponds to a PUSCH resource and a physical random access channel (PRACH) resource;
   wherein the data scrambling parameter is determined based on the PUSCH resource and/or the PRACH resource;
   wherein the data scrambling parameter is determined based on at least one of the following information about the PRACH resource:
   a random access channel occasion (RO);
   a random access preamble; or
   a random access radio network temporary identifier (RA-RNTI).

2. The random access transmission method according to claim 1, wherein the step of sending a random access message msgA based on the data scrambling parameter comprises:
   determining a scrambling sequence of the PUSCH based on the data scrambling parameter; and
   sending the random access message based on the scrambling sequence.

3. The random access transmission method according to claim 1, wherein the data scrambling parameter is determined based on at least one of the following information associated with the RO:
   first index information of a synchronization signal block (SSB) associated with the RO;
   second index information of a time-frequency domain resource corresponding to the RO;
   third index information of a primary synchronization signal PSS transmitted in the SSB associated with the RO; or
   fourth index information of a secondary synchronization signal SSS transmitted in the SSB associated with the RO.

4. The random access transmission method according to claim 1, wherein the data scrambling parameter is determined based on an index of the random access preamble.

5. The random access transmission method according to claim 1, wherein the data scrambling parameter is configured by a network device through a system broadcast message.

6. The random access transmission method according to claim 5, wherein the system broadcast message comprises configuration information of a data scrambling parameter set.

7. The random access transmission method according to claim 6, wherein the data scrambling parameter is one of the following association parameters associated with the data scrambling parameter set:
   an RO corresponding to a random access process;
   index information of an SSB associated with the RO; and
   index information of a random access preamble.

8. The random access transmission method according to claim 6, wherein the system broadcast message further comprises at least one of the following information:
   an association relationship between an RO and the data scrambling parameter; or
   an association relationship between a random access preamble and the data scrambling parameter.

9. A terminal, comprising a processor, a memory, and a computer program that is stored in the memory and that runs on the processor, wherein the computer program is executed by the processor to implement:
   obtaining a data scrambling parameter of a physical uplink shared channel (PUSCH); and
   sending a random access message msgA on a random access resource based on the data scrambling parameter, wherein the random access resource corresponds to a PUSCH resource and a physical random access channel (PRACH) resource;
   wherein the data scrambling parameter is determined based on the PUSCH resource and/or the PRACH resource;
   wherein the data scrambling parameter is determined based on at least one of the following information about the PRACH resource:
   a random access channel occasion (RO);
   a random access preamble; or
   a random access radio network temporary identifier (RA-RNTI).

10. The terminal according to claim 9, wherein the computer program is further executed by the processor to implement:
    determining a scrambling sequence of the PUSCH based on the data scrambling parameter; and
    sending the random access message based on the scrambling sequence.

11. The terminal according to claim 9, wherein the data scrambling parameter is determined based on at least one of the following information associated with the RO:
    first index information of a synchronization signal block (SSB) associated with the RO;
    second index information of a time-frequency domain resource corresponding to the RO;
    third index information of a primary synchronization signal PSS transmitted in the SSB associated with the RO; or
    fourth index information of a secondary synchronization signal SSS transmitted in the SSB associated with the RO.

12. The terminal according to claim 9, wherein the data scrambling parameter is determined based on an index of the random access preamble.

13. The terminal according to claim 9, wherein the data scrambling parameter is configured by a network device through a system broadcast message.

14. The terminal according to claim 13, wherein the system broadcast message comprises configuration information of a data scrambling parameter set.

15. The terminal according to claim 14, wherein the data scrambling parameter is one of the following association parameters associated with the data scrambling parameter set:
    an RO corresponding to a random access process;
    index information of an SSB associated with the RO; and
    index information of a random access preamble.

16. A non-transitory computer-readable storage medium, wherein the computer-readable storage medium stores a computer program, and when a processor executes the computer program, the following steps are implemented:
    obtaining a data scrambling parameter of a physical uplink shared channel (PUSCH); and
    sending a random access message msgA on a random access resource based on the data scrambling parameter, wherein the random access resource corresponds to a PUSCH resource and a physical random access channel (PRACH) resource;

wherein the data scrambling parameter is determined based on the PUSCH resource and/or the PRACH resource;

wherein the data scrambling parameter is determined based on at least one of the following information about the PRACH resource:

a random access channel occasion (RO);

a random access preamble; or a random access radio network temporary identifier (RA-RNTI).

17. The non-transitory computer-readable storage medium according to claim 16, wherein when a processor executes the computer program, the following steps are implemented:

determining a scrambling sequence of the PUSCH based on the data scrambling parameter; and sending the random access message based on the scrambling sequence.

18. The non-transitory computer-readable storage medium according to claim 16, wherein the data scrambling parameter is determined based on at least one of the following information associated with the RO:

first index information of a synchronization signal block (SSB) associated with the RO;

second index information of a time-frequency domain resource corresponding to the RO;

third index information of a primary synchronization signal PSS transmitted in the SSB associated with the RO; or fourth index information of a secondary synchronization signal SSS transmitted in the SSB associated with the RO.

19. The non-transitory computer-readable storage medium according to claim 16, wherein the data scrambling parameter is determined based on an index of the random access preamble.

20. The non-transitory computer-readable storage medium according to claim 16, wherein the data scrambling parameter is configured by a network device through a system broadcast message.

\* \* \* \* \*